United States Patent
Ebisawa et al.

(10) Patent No.: US 6,451,434 B1
(45) Date of Patent: Sep. 17, 2002

(54) GLASS LAMINATE, FUNCTIONAL TRANSPARENT ARTICLE AND METHOD OF ITS PRODUCTION

(75) Inventors: Junichi Ebisawa; Nobutaka Aomine; Satoshi Takeda; Kazuyoshi Noda, all of Kanagawa (JP); Daniel Decroupet, Jumet (BE)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 09/466,783

(22) Filed: Dec. 20, 1999

(30) Foreign Application Priority Data

Dec. 18, 1998 (EP) .................................................. 9820316

(51) Int. Cl.$^7$ ......................... B32B 17/06; B32B 15/04; B32B 15/20
(52) U.S. Cl. ....................... 428/432; 428/632; 428/658; 428/673; 428/702
(58) Field of Search ................................ 428/432, 615, 428/621, 632, 658, 673, 698, 701, 702

(56) References Cited

U.S. PATENT DOCUMENTS

| | | |
|---|---|---|
| 4,462,883 A | 7/1984 | Hart |
| 4,786,563 A | 11/1988 | Gillery et al. |
| 4,806,220 A | 2/1989 | Finley |
| 4,822,120 A | 4/1989 | Fan et al. |
| 4,859,532 A | 8/1989 | Oyama et al. |
| 4,898,789 A | 2/1990 | Finley |
| 4,943,484 A | 7/1990 | Goodman |
| 5,271,994 A | 12/1993 | Termath |
| 5,413,864 A | 5/1995 | Miyazaki et al. |
| 5,419,969 A | 5/1995 | Miyazaki et al. |
| 5,532,062 A | 7/1996 | Miyazaki et al. |
| 5,543,229 A | 8/1996 | Ohsaki et al. |
| 5,763,064 A | 6/1998 | Suzuki et al. |
| 5,837,361 A | 11/1998 | Glaser et al. |
| 5,993,617 A | 11/1999 | Ando et al. |
| RE37,446 E | 11/2001 | Miyazaki et al. |

FOREIGN PATENT DOCUMENTS

| | | |
|---|---|---|
| EP | 0 233 003 | 8/1987 |
| EP | 0 636 587 | 2/1995 |

*Primary Examiner*—Deborah Jones
*Assistant Examiner*—Andrew Piziali
(74) *Attorney, Agent, or Firm*—Oblon, Spivak, McClelland, Maier & Neustadt, P.C.

(57) ABSTRACT

A glass laminate comprising a glass substrate, an oxide layer as a first layer formed on the glass substrate, and at least one multilayer (B) and at least one layer (C) which are laminated in this order or alternately on the first layer, wherein the first layer comprises a zinc oxide film (A) containing Al in a ratio of Al/(Al+Zn) of from 15 to 50 at %, the layer (B) comprises Ag as the main component, the layer (C) is composed of at least one member selected from the group consisting of oxides, nitrides, carbides and double compounds thereof, and the total number of the first layer, the layer(s) (B) and the layer(s) (C) is 2n+1 (wherein n is a positive integer).

9 Claims, No Drawings

GLASS LAMINATE, FUNCTIONAL TRANSPARENT ARTICLE AND METHOD OF ITS PRODUCTION

BACKGROUND OF THE INVENTION

1. Field of the Invention

The present invention relates to a glass laminate, a functional transparent article and a method of its production, particularly to a glass laminate which does not deteriorate in optical properties or electrical properties when heated for processing such as tempering or bending by virtue of its excellent heat resistance, and therefore is suitable as a material for functional transparent articles, a method of producing a functional transparent article excellent in optical properties and electrical properties by using the glass laminate as a material and the functional transparent article.

2. Discussion of Background

In recent years, functional glasses having a laminated coating containing a layer mainly composed of silver as a selective optically reflective coating or an electrically conductive coating are used as a heat reflective glass such as a Low-E glass (Low Emission Glass), an electromagnetic glass shield or an electric glass heater for windshields of automobiles and trains, for window-panes for architectural use in houses and buildings and for the face plates of plasma displays.

A laminated coating containing a layer mainly composed of silver has a high light transmittance in the visible region and high reflectance to near infrared light and infrared light with long wave lengths of about 10 $\mu$m. Therefore, a glass having a laminated coating containing a layer mainly composed of silver not only allows visible light from the outside to enter but also diminishes entering heat rays of sunlight, and thereby lightens air-conditioning loads in the summer. In particular, when used for a double glazing, it can also diminish heat emitted from the inside, and thereby prevents dew condensation on window-panes and lightens heating loads in the winter. In short, it can be used as a high-efficiency heat reflective glass which has a high visible light transmittance and an excellent heat shielding effect, especially as a Low-E glass.

Further, a laminated coating containing a layer mainly composed of silver has a sheet resistance of 10 $\Omega/\square$ or less and has a low resistances among various transparent conductive coatings. Therefore, it can be used for a transparent electromagnetic glass shield or an electric glass heater.

For a laminated coating containing a layer mainly composed of silver, a multilayer laminated structure comprising a metal layer mainly composed of silver (hereinafter referred to simply as a "Ag-based layer") and layers composed of oxides or nitrides of Zn, Ti, Sn or Si is known. For example, a glass laminate comprising a glass substrate and three layers of ZnO/Ag/ZnO or five layers of ZnO/Ag/ZnO/Ag/ZnO formed on the glass substrate is known.

On the other hand, glass laminates are expected to be processed into various shapes or tempered according to their use. In forming (such as bending) or tempering procedure, heat treatment at about 570 to 700° C. is followed by molding or quenching treatment. For example, heat reflective glasses used for windshields, especially front an rear windshields of automobiles are bent into curved shape after heated to about 570 to 700° C. Heat reflective glasses for architectural use as window-panes are sometimes also formed into not planar but curved or complicated shapes according to the shapes of windows of buildings.

However, conventional glass laminates sometimes do not show desired performance because heating (so-called post-heating) treatment for forming or tempering after lamination of Ag-based layers and transparent protective layers impairs the properties of the Ag-based layers and deteriorates the optical properties and electrical properties. This problem might be solved by laminating Ag-based layers and transparent protective layers on a glass substrate preliminarily formed into a predetermined shape. However, in order to form Ag-based layers and transparent protective layers on a molded glass, for example on a curved glass by sputtering in the same chamber, because each layer is formed in a different atmosphere, a production procedure in which sputtering gases are changed while the substrate is shuttled have to be adopted. The production procedure is inferior in productivity, restricts production output and can hardly reduce costs.

In order to remove these problems, various post-heat treatable glass laminates have been proposed.

For example, JP-A-10-503745 discloses a transparent article comprising a transparent non-metallic substrate and a transparent film stack containing at least one infrared reflective metal film deposited by sputtering on the substrate, a dielectric film formed on the metal film and a silicon nitride protective film formed on the dielectric film.

Japanese Patent Publication of Japanese Patent No. 2509925 has proposed a glass substrate having a coating comprising a silver layer of 5–30 nm thick; an additional metal layer of aluminum, titanium, zinc or tantalum formed on the silver layer; and an anti-reflective metal oxide layer formed on the additional metal layer. This publication has also proposed a method of producing a curved and/or tempered silver-coated glass substrate characterized in that a glass substrate is subjected to bending and/or tempering cycles in which the substrate is heated to the softening point of the glass or above so that high light transmittance is imparted to the coated glass during the bending and/or tempering cycles.

Further, JP-A-8-238710 has proposed a transparent substrate having a metal layer characteristic in the infrared region, a first dielectric coating formed under the metal layer, a second dielectric coating formed on the metal layer and a protective metal layer which is formed directly on the metal layer and in contact with the metal layer, wherein the second coating contains at least one barrier layer of at least 10 nm thick against diffusion of oxygen which is made of at least one member selected from silicon compounds $SiO_2$, $SiO_xC_y$ and $SiO_xN_y$, nitrides such as $Si_3N_4$ and AlN and carbides such as SiC, TiC, CrC and TaC, and the upper metal layer is in direct contact with the lower dielectric coating.

JP-A-62-216944 has proposed a method of producing a window-pane having high transmitting properties in the visible spectral region and high heat reflective properties, which comprises coating a substrate made of an inorganic glass with:

a) a first layer comprised of an oxide selected from the group consisting of tin oxide, silicon dioxide, aluminum oxide, tantalum oxide and zirconium oxide and their mixed oxides, b) a second layer comprised of a metal selected from the group consisting of tantalum, tungsten, nickel and iron and alloys comprising one of them in an amount of at least 50 wt %, c) a third layer composed of silver or a silver alloy containing at least 50 wt % of silver, d) a fourth layer composed of a metal selected from the same group as the second layer, and e) a fifth layer composed of an oxide selected from the same group of oxides as the first layer,
wherein the substrate is heated to at least the softening point of the glass together with a packet of all the layers a) to e), plastically deformed under heating and cooled in the deformed state.

Furthermore, JP-A-5-213632 has proposed a method of producing heat treated coated glass comprising forming on a glass substrate a heat shielding film of a metal such as SUS, Ti or Cr, or a nitride, boride or carbide thereof, then forming a first protective layer of a zirconium siliconitride or the like which is transparent in the visible region and remains transparent even after oxidation, and further forming a second protective layer of an oxide such as tin oxide having a high barrier property.

However, these conventional glass laminates proposed so far are not satisfactory in heat resistance during post-heating and have a problem that heat treatment involved in processing impairs Ag-based layers and deteriorates optical properties.

BRIEF SUMMARY OF THE INVENTION

The object of the present invention is to provide a glass laminate which does not deteriorate in optical properties when heated for processing such as tempering or bending by virtue of its excellent heat resistance and therefore is suitable as a material for functional transparent articles.

Another object of the present invention is to provide a method of producing a functional transparent article excellent in optical properties by using the glass laminate as a material and the functional transparent article.

To solve the above-mentioned problems, the present invention provides a glass laminate comprising a glass substrate, an oxide layer as a first layer formed on the glass substrate, at least one metal layer (B) (hereinafter referred to simply as "layer (B)") and at least one oxide nitride, carbide or double compound layer (C) (hereinafter referred to simply as layer (C)) which are laminated in this order or alternately on the first layer, wherein the first layer comprises a zinc oxide film (A) containing Al in a ratio of Al/(Al+Zn) of from 15 to 50 at % (hereinafter referred to simply as "film (A)"), the layer (B) comprises Ag as the main component, the layer (C) is composed of at least one member selected from the group consisting of oxides, nitrides, carbides and double compounds thereof, and the total number of the first layer, the layer(s) (B) and the layer(s) (C) is 2n+1 (wherein n is a positive integer).

Herein and hereafter, Al/(Al+Zn) means the ratio (at %) of the Al atoms to the total of Al atoms and the Zn atoms in a layer or a film.

The present invention also provides, as a specific embodiment of the above-mentioned glass laminate, a glass laminate comprising a glass substrate, and an oxide later as a first layer comprising a film (A), a layer (B) and a layer (C) which are laminated on the substrate in this order from the substrate side.

The present invention further provides, as a specific embodiment of the above-mentioned glass laminate, a glass laminate comprising a glass substrate, and an oxide layer as a first layer comprising a film (A) formed on the substrate side, a layer (B), a layer (C), a layer (B) and a layer (C) formed on the substrate in this order from the substrate side.

The present invention still further provides a method of producing a functional transparent article comprising a step of treating the above-mentioned glass laminate with heat.

The present invention also provides a functional transparent article obtained by the above-mentioned method.

Now, the glass laminate, the functional transparent article and the method of its production of the present invention will be described in detail.

DETAILED DESCRIPTION OF THE INVENTION

The glass laminate of the present invention is a glass laminate having such a layer structure that at least one layer (B) and at least one layer (C) are laminated in this order or alternately on an oxide layer as a first layer comprising a film (A). The glass laminate of the present invention may have such a structure that a layer (B) and a layer (C) are laminated in this order on a first layer, or may have such a structure that more than one layer (B) and more than one layer (C) are laminated alternately. If necessary, additional layers may be formed between the layer(s) (B) and the layer(s) (C).

Further, in the laminate of the present invention, the total number of the first layer, the layer(s) (B) and the layer(s) (C) laminated on the first layer is 2n+1 (wherein n is a positive integer).

The glass substrate in the glass laminate of the present invention is not particularly limited. When the glass laminate of the present invention is used as a window (e.g. windshield) of vehicles such as automobiles or as a windowpane for architectural use, soda lime glass is usually used as the glass substrate.

The first layer formed on the glass substrate in the present invention is an oxide layer and may comprise a film (A) only, or may be a multiple layer comprising an additional film (a film consisting of oxides) (hereinafter referred to simply as a "film (A-1)"). In the first layer, the film (A) and the film (A-1) are formed preferably in such a structure that the film (A) is adjacent to the glass substrate.

The film (A-1) is a film composed of an oxide. As the constituent of the film (A-1), an oxide of Zn, Ti, Sn, Si, Ta, Al, Cr, Zr, Nb, Ga or In may be specifically mentioned.

As the oxide, for example, an oxide of at least one element selected from the group consisting of Zn, Ti, Sn, Si, Al, Ta and Zr may be mentioned. In addition, for example, zinc oxide containing Al, Ga, Si or Sn or indium oxide containing Sn may be mentioned.

The film (A-1) may be a single film or a multiple film.

As the film (A-1), a zinc oxide film or a zinc oxide film containing at least one element selected from the group consisting of Sn, Al, Cr, Ti, Si, B, Mg, In and Ga is preferable, because it makes it possible to stably form a layer (B) with a high crystallinity. Especially, a zinc oxide film containing Al and/or Ti is preferable.

A specific example of the film (A-1) is a zinc oxide film (a) containing Al in a ratio of Al/(Al+Zn) of from 1 to 10 at %.

Especially, when the first layer comprises the film (A) and a zinc oxide film (a) containing Al in a ratio of Al/(Al+Zn) of from 1 to 10 at %, it is preferred to form the film (a) in contact with a layer (B) comprising Ag as the main component and form the film (A) between the glass substrate and the film (a). The Al content of the film (a) is preferably from 1.5 to 10 at %, especially from 3 to 5 at %.

Formation of the film (a) as the film (A-1) is advantageous in view of production costs, because formation of the film (A) can be followed by formation of the film (A-1) with little change in the film-forming apparatus, the atmosphere and the conditions. The first layer may also be a multiple layer consisting of three layers of a film (A-1) adjacent to the substrate, a film (A) and a film (A-1) laminated in this order.

Alkaline components of the glass substrate such as $Na^+$ ion liberated upon post-heating diffuses into the first layer and accumulates there, and erodes Ag in the layer (B) by interdiffusing with oxidatively ionized Ag. The resulting disorder of the layer structure brings about deterioration in the optical properties and electrical properties. The film (A) has the effect of preventing such deterioration.

The ratio of Al/(Al+Zn) in the film (A) is from 15 to 50 at %. A zinc oxide film containing Al in a ratio of Al/(Al+Zn) of less than 15 at % is no longer amorphous because the Al content is too small, and crystals of zinc oxide grow to form a crystal structure made of thin crystal grains grown perpendicular to the substrate, which is so called a columnar crystal structure. In a film having such a columnar crystal structure, diffusion is likely to occur at the grain boundaries, and it is impossible to prevent deterioration in optical properties and electrical properties due to the diffusion of alkaline components liberated from the substrate. On the other hand, properties of a zinc oxide film having a Al/(Al+Zn) ratio of more than 50 at % are more like those of an aluminum oxide film. An aluminum oxide film is intrinsically hardly capable of blocking alkaline components. Therefore, a zinc oxide film having a Al/(Al+Zn) ratio of more than 50 at % can not sufficiently prevent deterioration in optical properties and electrical properties due to the diffusion of alkaline components liberated from the substrate. The ratio of Al/(Al+Zn) is preferably from 15 to 30 at %.

The thickness (which means geometrical thickness hereinafter) of the film (A) in the first layer is preferably at least 5 nm, more preferably at least 10 nm, in order to thoroughly prevent diffusion of alkaline components from the glass substrate into the laminated coating. The total thickness of the first layer is appropriately selected from the range of from 11 to 50 nm according to the optical properties required for the laminated coating in the glass laminate of the present invention. The first layer may also consist of a film (A) only.

The layer (B) is a layer composed of Ag only or a layer comprising Ag as the main component and an additional metal element (such as Pd, Au or Cu). When an additional metal element is contained, the content of the additional metal element is preferably from 0.3 to 10 at %, based on the total of Ag and the additional metal element. If the content of an additional metal element is less than 0.3 at %, the effect of stabilizing Ag is small. Also, if the content of an additional metal element exceeds 10 at %, the effect of stabilizing Ag diminishes. Especially, Pd as the additional metal element can immobilize Ag atoms, namely depress the migration of Ag atoms and affords a layer which is excellent in stability and chemical resistance at high temperatures. As the Pd content increases, the rate of film formation tends to decrease, the visible light transmittance tends to lower, and the shielding selectivity between visible rays and near infrared rays tends to become poor. Therefore, the Pd content is preferred to be at most 5.0 at %, especially from 0.3 to 2.0 at %.

When the glass laminate of the present invention comprises more than one layer (B), each layer (B) may have the same composition or a different composition. The layer (B) may be a multiple layer comprising at least two laminated films, for example, a multiple layer composed of Ag and Pd.

The layer (C) is a layer composed of at least one member selected from the group consisting of oxides, nitrides and carbides and double compounds thereof.

As the constituent of the layer (C), an oxide, a nitride or a carbide of Zn, Ti, Sn, Si, Ta, Al, Cr, Zr, Nb, Ga or In or a double compound thereof may be specifically mentioned.

As the oxide, for example, an oxide of at least one element selected from the group consisting of Zn, Ti, Sn, Si, Al, Ta or Zr may be mentioned. In addition, for example, zinc oxide containing Al, Ga, Si or Sn or indium oxide containing Sn may be mentioned.

As the nitride, a nitride of at least one element selected from the group consisting of Si, Al and B (a nitride (A)) or a mixture (inclusive of a double nitride) of a nitride of Zr or Ti with a nitride (A) may be mentioned.

As the double compound, $SiO_xC_y$, $SiO_xN_y$, $SiAl_xN_y$ or $SiAl_xO_yN_z$ may be mentioned. The film may be a single film or a multiple film.

The constituent of the layer (C) may, for example, be the same as that of the film (A-1) or be the same as or similar to that of the film (A).

The film (A-1) and the layer (C) have the same composition or different compositions. The layer (C) may be a single layer or a multiple layer comprising at least two laminated films, for example, a layer comprising at least two films such as a film (A) and a titanium oxide film or a silicon nitride film.

When the glass laminate of the present invention comprises more than one layer (C), each layer (C) may have the same composition or a different composition.

In the glass laminate of the present invention, the farthest of the layers (C) from the substrate (hereinafter referred to simply as "the layer $(C_0)$" is preferred to be a nitride layer or an oxide layer.

As the nitride layer, a nitride layer composed of at least one nitride selected from the group consisting of silicon nitride, aluminum nitride, boron nitride, zirconium nitride, titanium nitride and hafnium nitride (hereinafter referred to as "a layer (C—N)")is preferred. Particularly preferred is silicon nitride, aluminum nitride, a mixed nitride of silicon nitride and aluminum nitride or a mixed nitride of silicon nitride and zirconium nitride.

As the oxide layer, an oxide layer composed of at least one oxide selected from the group consisting of titanium oxide, zirconium oxide, tin oxide and silicon oxide (hereinafter referred to as "a layer (C—O)")is preferred. Particularly preferred is an mixed oxide of tin oxide and silicon oxide.

Especially, a layer (C—N) as the layer $(C_0)$ is effective in preventing deterioration of the layer (B) due to diffusion of oxygen and water from the surface of the glass laminate during heat treatment for tempering or bending, in storage before conversion into end products or in use. The layer (C—N) hardly allows oxygen or water to diffuse inside, and therefore can remarkably improve the oxidation resistance and the moisture resistance of the glass laminate by synergically acting with the film (A) in the first layer.

When the glass laminate of the present invention and another glass substrate are bonded via polyvinyl butyral (PVB), a layer made of a material having an energy gap of at least 4 eV (such as a layer (C—N) having an energy gap of at least 4 eV or a layer (C—O) having an energy gap of at least 4 eV) is effective as the layer $(C_0)$ which is in contact with PVB, not only in providing a laminated glass useful as a safety glass for automobiles or a burglar security glass but also in preventing deterioration of the Ag-based layer, which is susceptible to scratching and corrosion because the glass laminate of the present invention can adhere to the other glass substrate via PVB for a long term and.

Further, in the invention, when a layer composed of an oxide or a double compound containing an oxide such as an oxynitride is formed as a layer (C) by reactive sputtering in an atmosphere containing an oxidative gas, formation of such a layer (C) directly on the layer (B) can fail to give a glass laminate having desired optical and electrical properties because of oxidation of the layer (B). Therefore, it is preferred to form a metal or nitride barrier layer. Such a barrier layer usually stays in a partly oxidized state, and during heat treatment, oxidizes into a transparent oxide having a higher visible light transmittance.

As the metal or nitride constituent of the barrier layer, a metal such as Ti, Zn, AlZn, TiZn, SUS, Zr, Ta, NiCr, Ni or Ni—Ti, or an incomplete oxide (or a partial oxide) or a nitride of such a metal, is mentioned. The thickness of a barrier layer is preferably from 1 to 5 nm. A barrier layer thinner than 1 nm does not work well, while a barrier layer thicker than 5 nm can lower the visible light transmittance of the glass laminate or cause other problems.

When an oxide layer, for example, composed of zinc oxide containing Al is formed directly on the layer (B) as the layer (C), an Al—Zn alloy barrier layer having the same metal ratio can strengthen the adhesion between the layer (B) and the layer (C) and thus is effective in improving durability of the layers of the multilayer structure. An Al—Zn alloy barrier layer is also preferable in view of the crystallinity of Ag in the layer (B) and the heat resistance. A barrier layer may be formed under the layer (B), too.

In the layer (Co), the farthest film from the substrate is preferably a film composed of a mixture of silicon oxide and tin oxide (hereinafter referred to as a "$SiSn_xO_y$ film"). Formation of a film mainly composed of zinc oxide under a $SiSn_xO_y$ film is effective, because the good compatibility between a $SiSn_xO_y$ film and a film mainly composed of zinc oxide leads to strong adhesion at the interface.

The ratio of Si to the total of Sn and Si in the $SiSn_xO_y$ film is from 5 to 95 at %, preferably from 30 to 90 at %, more preferably from 40 to 90 at %.

A $SiSn_xO_y$ film improves the function of preventing penetration of water (water resistance). When silicon oxide is incorporated into a tin oxide film, the film changes from crystalline to amorphous and becomes dense. If the silicon oxide content is too low, the water resistance is poor. Besides, a $SiSn_xO_y$ film is more crystalline than amorphous and is likely to lack surface smoothness. On the other hand, a $SiSn_xO_y$ film having too high a silicon oxide content requires an alloy target having a high Si content to be formed by DC sputtering. Such a target is likely to arc and leads to low productivity.

The thickness of a $SiSn_xO_y$ film is not particularly limited, but have to be at least about 5 nm in order to impart good water resistance and scratch resistance. As the thickness increases, the water resistance and the scratch resistance improve. Although there is no upper limit on the thickness, 20 nm is enough for satisfactory performance.

As specific embodiments of the glass laminate of the present invention, a three layer type (first layer/layer (B)/layer (C)), a five layer type (first layer/layer (B)/layer (C)/layer (B)/layer (C)) and a seven layer type (first layer/layer (B)/layer (C)/layer (B)/layer (C)/layer (B)/layer (C)) may be mentioned. A multilayer laminate having more than seven layers, though possible, is not suitable to use for window-panes, because the visible light transmittance of a multilayer laminated coating decreases as the number of layers increases. Preferred are the three layer type and the five layer type, which impart an anti-reflective effect and do not give a so-called glaring appearance as well as have high visible light transmittances and high transparency. A five layer type (a two Ag-based layer type) laminate is particularly preferable to a three layer type (a one Ag-based layer type) for its excellent heat shielding ability.

In a glass laminate having a three layer type laminated coating, the thicknesses of the first layer, the layer (B) and the layer (C) are preferably from 15 to 45 nm, from 9 to 16 nm (especially from 9 to 12 nm) and from 30 to 45 nm, respectively. A glass laminate comprising a colorless soda lime glass substrate of 2 nm thick and a three layer type laminated coating formed on the substrate has such representative optical properties as a visible light transmittance of about from 75 to 85% and a heat transmittance of about from 50 to 70% after heat treatment.

In a glass laminate having a five layer type laminated coating, the thicknesses of the first layer, the layer (B), the layer (C), the layer (B) and the layer (C) are preferably from 16 to 50 nm (especially from 20 to 45 nm), from 6.5 to 16 nm (especially from 6.5 to 12.5 nm), from 40 to 100 nm (especially from 45 to 90 nm), from 6.5 to 16 nm (especially from 6.5 to 12.5 nm) and from 16 to 50 nm (especially from 20 to 45 nm), respectively. A glass laminate comprising a colorless soda lime glass substrate of 2 nm thick and a five layer type laminated coating formed on the substrate has such representative optical properties as a visible light transmittance of about from 70 to 80% and a heat transmittance of about from 40 to 50% after heat treatment.

In the present invention, the thicknesses of the film (A), the first layer, the layer (B) and the layer (C) can be appropriately adjusted or changed according to the properties such as color tone, transmittance, reflectance, heat shielding ability or electrical properties required when the glass laminate of the present invention is used.

The glass laminate of the present invention can be produced by cleansing the surface of a glass substrate and forming a first layer comprising a film (A), layer(s) (B) and layer(s) (C) successively, by vapor deposition, CVD, sputtering or the like, though the method is not limited. DC sputtering is advantageous for a glass substrate with a large area in view of the easiness of controlling thicknesses evenly and the high productivity.

The film (A) can be formed 1) by sputtering of a ceramic target of sintered zinc oxide and aluminum oxide having an Al/(Al+Zn) ratio adjusted within the above-mentioned specific range in argon gas or in an argon gas atmosphere containing an oxidative gas, or 2) by reactive sputtering of a Zn—Al alloy target having an Al/(Al+Zn) ratio adjusted within the above-mentioned specific range in an oxidative atmosphere.

The present invention also provides a method of producing a functional transparent article comprising a step of treating the glass substrate with heat, and a functional transparent article obtained by the method.

Specific examples of the functional transparent article include, for example, windows of vehicles such as automobiles and trains, especially, 1) windows having a curved or complicated three-dimensional shape for front windshields and backlights of automobiles, 2) window-panes having a curved or complicated three-dimensional shape for architectural use in buildings and houses, 3) electric glass heaters which generate heat when electricity is applied to the Ag-based layer or 4) electromagnetic glass shields.

The functional transparent article is useful because the glass laminate of the present invention as a material does not deteriorate in optical properties or electrical properties and maintains desired properties during processing by virtue of its excellent heat resistance.

In the method of producing a functional transparent article of the present invention, a glass laminate is subjected to heat treatment for 1) bending, 2) tempering, 3) sintering of colored ceramic print or silver bus bar print, 4) vacuum sealing of vacuum double glazing and 5) calcination of a wet-coated low reflective coating or antiglare coating. For example, it is heated to a temperature of from 570 to 700° C. in the atmosphere for 1) bending or 2) tempering.

Now, the present invention will be described in further detail with reference to Examples and Comparative Examples.

EXAMPLE 1

A colorless soda lime glass substrate of 30 cm long×30 cm wide×5 mm thick having a clean surface which had been polished, cleansed with a surfactant and rinsed with pure water successively was loaded into an in-line sputtering machine which sputters while conveying a substrate, and five layers with the following thicknesses (geometrical thicknesses) were formed successively on the substrate shuttling in the machine without breaking a vacuum by replacing the sputtering atmospheric gas as the targets were switched, to give a glass laminate. Before that, the geometrical thicknesses of preliminary films formed under the same conditions were measured with a Talystep (tradename: manufactured by Taylor-Hobson), and the thickness of each layer was controlled by adjusting the speed of the conveyed substrate on the basis of the results of the thickness measurement so that layers with the predetermined thicknesses were formed.

First layer 33 nm
Second layer 10 nm
Third layer 75 nm
Fourth layer 10 nm
Fifth layer 33 nm In the formation of the first layer, a ZnO film containing Al (a $ZnAl_xO_y$ film: $[Al/(Al+Zn)]\times100=30$ at %) was formed by sputtering a Zn target containing 30 at % of Al in an atmosphere of a gas mixture of Ar and $O_2$ under the conditions that the pressure was $2.0\times10^{-3}$ Torr (0.266 Pa), and the input power was 2.2 W/cm², and then a ZnO film containing Al (an AZO film: $[Al/(Al+Zn)]\times100=3$ at %) was formed by sputtering a Zn target containing 3 at % of Al in an atmosphere of a gas mixture of Ar and $O_2$ under the conditions that the pressure was $2.0\times10^{-3}$ Torr, and the input power was 2.2 W/cm² so that a layer consisting of the $ZnAl_xO_y$ film (11 nm) and the AZO film (22 nm) laminated in this order from the glass surface side was formed.

As the second and fourth layers, metal layers comprising Ag as the main component (Ag-1 at % Pd layers) were formed by sputtering a Ag target containing 1 at % of Pd in an atmosphere of argon gas under the conditions that the pressure was $2.0\times10^{-3}$ Torr, and the input power was 0.86 W/cm².

As the third layer, a Zn layer containing Al (a AZO layer: $[Al/(Al+Zn)]\times100=3$ at %) was formed by sputtering a Zn target containing 3 at % of Al in an atmosphere of a gas mixture of Ar and $O_2$ under the conditions that the pressure was $2.0\times10^{-3}$ Torr, and the input power was 2.2 W/cm2.

In the formation of the fifth layer, a ZnO film containing Al (an AZO layer: $[Al/(Al+Zn)]\times100=3$ at %) of 22 nm thick was firstly formed in the same manner as the third layer, and then a silicon nitride film (a $SiN_x$ film) of 11 nm thick was formed by sputtering a conductive metallic silicon target in an atmosphere of a gas mixture of Ar and $N_2$ under the conditions that the pressure was $2.0\times10^{-3}$ Torr, and the input power was 2.2 W/cm².

Before the formation of the third and fifth layers, metal barrier layers of Zn and Al (thicknesses: about 2 nm) were formed at the interfaces between the second and third layers and between the fourth and fifth layers by sputtering a Zn target containing Al in an Al/(Al+Zn) ratio of 3 at % under the conditions that the pressure was $2.0\times10^{-3}$ Torr, and the input power was 0.2 W/cm².

The glass laminate thus obtained was subjected to heat treatment for bending in such a manner that the measured glass temperature was kept at 623° C. for 5 minutes to give a functional transparent article. The visible light transmittances and heat transmittances before and after the heat treatment and the haze after the heat treatment were measured with a spectrophotometer and a haze meter, respectively. The results are shown in Table 1.

The haze was measured in accordance with JIS R3212, and the visible light transmittance and heat transmittance was measured in accordance with JIS R3106.

EXAMPLE 2

A functional transparent article was prepared in the same manner as in Example 1 except that the thicknesses of the $ZnAl_xO_y$ film and the AZO film were changed as shown in Table 1 while the thickness of the first layer was kept the same as in Example 1 (33 nm), and evaluated in the same manner as in Example 1. The results are shown in Table 1.

Comparative Examples 1 to 4

Glass laminates were prepared in the same manner as in Example 1 except that a tin oxide film/an AZO film in the thickness ratios shown in Table 1 were formed as a first layer, and then functional transparent articles were prepared and evaluated in the same manner as in Example 1. The results are shown in Table 1. The conditions for formation of the tin oxide films are shown as Table 2.

Comparative Example 5

A glass laminate was prepared in the same manner as in Example 1 except that a titanium oxide film/an AZO film in the thickness ratio shown in Table 1 were formed as a first layer, and then a functional transparent article was prepared and evaluated in the same manner as in Example 1. The results are shown in Table 1. The conditions for formation of the titanium oxide films are shown as Table 2.

Comparative Examples 6 and 7

Glass laminates were prepared in the same manner as in Example 1 except that a zinc oxide film containing Sn in a Sn/(Sn+Zn) ratio of 10 at % (a $ZnSn_xO_y$ film)/an AZO film in the thickness ratios shown in Table 1 were formed as a first layer, and then functional transparent articles were prepared and evaluated in the same manner as in Example 1. The results are shown in Table 1. The conditions for formation of the $ZnSn_xO_y$ films are shown as Table 2.

Comparative Example 8

A glass laminate was prepared in the same manner as in Example 1 except that a silicon nitride film containing Zr (a $SiZr_xN_y$ film) /an AZO film in the thickness ratio shown in Table 1 were formed as a first layer, and then a functional transparent article was prepared and evaluated in the same manner as in Example 1. The results are shown in Table 1. The conditions for formation of the $SiZr_xN_y$ film are shown as Table 2.

Comparative Example 9

A glass laminate was prepared in the same manner as in Example 1 except that a silicon carbooxynitride film (a $SiO_xC_yN_z$ film) /an AZO film in the thickness ratio shown in Table 1 were formed as a first layer, and then a functional transparent article was prepared and evaluated in the same manner as in Example 1. The results are shown in Table 1. The conditions for formation of the $SiO_xC_yN_z$ film are shown as Table 2.

TABLE 1

| | 1st layer (nm/nm) | Before heat treatment | | After heat treatment | | |
|---|---|---|---|---|---|---|
| | | Visible light transmittance (%) | Heat transmittance (%) | Visible light transmittance (%) | Heat transmittance (%) | Haze (%) |
| Example | ZnAl$_x$O$_y$ [*1]/AZO[*2] | | | | | |
| 1 | 11/22 | 60.7 | 33.2 | 75.3 | 49.2 | 0.4 |
| 2 | 33/0 | 59.3 | 32.1 | 74.0 | 48.1 | 0.4 |
| Comparative Example | SnO$_2$/AZO | | | | | |
| 1 | 11/22 | 61.8 | 34.1 | 74.1 | 50.6 | 0.8 |
| 2 | 16.5/16.5 | 61.3 | 33.9 | 71.6 | 49.9 | 0.3 |
| 3 | 22/11 | 61.0 | 33.5 | 70.3 | 48.9 | 0.3 |
| 4 | 33/0 | 63.2 | 35.2 | 71.4 | 48.8 | 0.4 |
| | TiO$_2$/AZO | | | | | |
| 5 | 11/22 | 56.8 | 30.9 | 75.5 | 46.8 | 1.1 |
| | ZnSn$_x$O$_y$ [*3]/AZO | | | | | |
| 6 | 11/22 | 54.8 | 33.4 | 75.2 | 46.1 | 0.7 |
| 7 | 33/0 | 57.7 | 31.0 | 70.2 | 45.2 | 0.3 |
| | SiZr$_x$N$_y$ [*4]/AZO | | | | | |
| 8 | 11/22 | 55.5 | 29.9 | 64.9 | 43.0 | 8.2 |
| | SiO$_x$C$_y$N$_z$ [*5]/AZO | | | | | |
| 9 | 11/22 | 54.1 | 28.7 | 64.9 | 37.7 | 4.7 |

Note
*1 ZnAl$_x$O$_y$: a zinc oxide film containing Al in a ratio of [Al/(Zn + Al)] × 100 = 30 at %
*2 AZO: a zinc oxide film containing Al in a ratio of [Al/(Zn + Al)] × 100 = 3 at %
*3 ZnSn$_x$O$_y$: a zinc oxide film containing Sn in a ratio of [Sn/(Zn + Sn)] × 100 = 10 at %
*4 SiZr$_x$N$_y$: a silicon nitride film containing Zr in a ratio of [Zr/(Si + Zr)] × 100 = 33 at %
*5 SiO$_x$C$_y$N$_z$: a silicon carbooxynitride film

TABLE 2

| | Atmospheric gas | Sputtering pressure | Input power | Target |
|---|---|---|---|---|
| Comparative Examples 1 to 4 | Argon + Oxygen | 2.0 × 10$^{-3}$ Torr | 2.2 W/cm$^2$ | Sn |
| Comparative Example 5 | Argon + Oxygen | 2.0 × 10$^{-3}$ Torr | 2.2 W/cm$^2$ | Ti |
| Comparative Examples 6 and 7 | Argon + Oxygen | 2.0 × 10$^{-3}$ Torr | 2.2 W/cm$^2$ | Zn—Sn *1 |
| Comparative Example 8 | Argon + Nitrogen | 2.0 × 10$^{-3}$ Torr | 2.2 W/cm$^2$ | ZrSi$_2$ *2 |
| Comparative Example 9 | Carbon dioxide + Nitrogen | 2.0 × 10$^{-3}$ Torr | 2.2 W/cm$^2$ | Si |

Note
*1: Zn—Sn: 10 at % Sn
*2: ZrSi Sintered zirconium silicide (Zr: 33 at %, Si: 67 at %)

As shown in Table 1, in Examples 1 to 2, the Ag-1 at % Pd layer did not deteriorate during heat treatment. As the partly oxidized barrier layer oxidized thoroughly, the Ag-1 at % Pd layer was annealed, and lattice defects decreased. Consequently, high transparency corresponding to a visible light transmittance of 73% or above in case of using a colorless soda lime glass substrate of 5 mm thick (corresponding to a visible light transmittance of at least 75% in case of using a colorless soda lime glass substrate of 2 mm thick) and good heat shielding ability corresponding to a heat transmittance of at most 50% were attained. The haze was very low, i.e. at most 0.5%.

When a tin oxide film was formed instead of the ZnAl$_x$O$_y$ film of the first layer in Comparative Examples 2 to 4, the visible light transmittances after heat treatment ranged from 70.3 to 71.6%, and thus, satisfactory transparency was not attained. In Comparative Example 1, whereas the visible light transmittance was as high as 74.1%, the appearance was bad with the haze being as high as 0.8%.

When a Tio$_2$ film, a SiZr$_x$N$_y$ film or a SiO$_x$C$_y$N$_z$ film was formed instead of the ZnAl$_x$O$_y$ film of the first layer in Comparative Examples 5, 8 and 9, the hazes after heat treatment were as high as from 1.1 to 8.2%, and thus the practicability was poor.

Further, when a ZnSn$_x$O$_y$ film was formed instead of the ZnAl$_x$O$_y$ film of the first layer in Comparative Examples 6 and 7, if the thickness of the film was enough to attain high visible light transmittance and heat reflectance after heat treatment (Comparative Example 6), the haze was rather high, and on the other hand, if the thickness of the film was enough to attain a low haze (Comparative Example 7), the visible light transmittance was inadequate.

EXAMPLES 3 and 4

Colorless soda lime glass substrates of 30 cm long×30 cm wide×5 mm thick having a cleansed surface were loaded into an in-line sputtering machine which sputters while conveying a substrate, and glass laminates were prepared by forming laminated coatings having the layer structures shown in Table 3 in the same manner as in Example 1. The thickness of each layer was controlled by adjusting the speed of a conveyed substrate in the same manner as in Example 1 so that layers with the predetermined thicknesses were formed.

TABLE 3

|  | Example 3 | Example 4 |
|---|---|---|
| 1st layer | $ZnAl_xO_y$ (33 nm) layer | $ZnAl_xO_y$ (33 nm) layer |
| 2nd layer | Ag-1 at % Pd layer (10 nm) | Ag-1 at % Pd layer (10 nm) |
| 3rd layer | AZO layer (75 nm) | AZO layer (75 nm) |
| 4th layer | Ag-1 at % Pd layer (10 nm) | Ag-1 at % Pd layer (10 nm) |
| 5th layer | AZO film/ $AlN_x$ film (23 nm/10 nm) | AZO film/ $SiZr_xN_y$ film *1 (23 nm/10 nm) |

Note
($SiZr_xN_y$ film): a silicon nitride film containing Zr

The first to fourth layers were formed under the same conditions as the first to fourth layers in Example 1.

The AZO film in the fifth layer was formed under the same conditions as the AZO film in the fifth layer in Example 1.

In Example 3, the aluminum nitride ($AlN_x$) film in the fifth layer was formed by sputtering an Al target in an atmosphere of a gas mixture of Ar and $N_2$ under the conditions that the pressure was $2.0 \times 10^{-3}$ Torr, and the input power was 2.2 W/cm$^2$.

In Example 4, the silicon nitride film containing Zr in the fifth layer was formed in the same manner as in Comparative Example 8.

Further, metal barrier layers of Zn and Al (thicknesses: about 2 nm) were formed at the interfaces between the second and third layers and between the fourth and fifth layers under the same conditions as the barrier layers in Example 1.

The glass laminates thus obtained were subjected to heat treatment for tempering at 650° C. for 3 minutes, and then cooled with air to give functional transparent articles. The visible light transmittances, heat transmittances and hazes of the functional transparent articles were measured with a spectrophotometer and a haze meter, respectively. The results given below show satisfactorily low hazes as well as good transparency (high visible light transmittances) and good heat shielding ability (low heat transmittances).

TABLE 4

|  | Visible light transmittance (%) | Heat transmittance (%) | Haze (%) |
|---|---|---|---|
| Example 3 | 77.3 | 47.3 | 0.4 |
| Example 4 | 77.8 | 48.6 | 0.4 |

EXAMPLE 5

By using colorless soda lime glass substrates of 30 cm long×30 cm wide×5 mm thick having a cleansed surface, glass laminates were prepared by forming laminated coatings having the following layer structure. The thickness of each layer was controlled by adjusting the speed of a conveyed substrate in the same manner as in Example 1 so that layers with the predetermined thicknesses were formed.
First layer ($ZnAl_xO_y$ layer) 38 nm
Second layer (Ag-1 at % Pd layer) 10 nm
Third layer (AZO film/$AlN_x$ film) 28 nm/7.5 nm The first and second layers were formed under the same conditions as the first and second layers in Example 1, respectively.

The AZO film in the third layer was formed under the same conditions as the AZO film in the fifth layer in Example 1.

Further, a metal barrier layer of Zn and Al (thickness: about 2 nm) was formed at the interface between the second and third layers under the same conditions as the barrier layers in Example 1.

Still further, an AlNx film was formed on the AZO film in the third layer by sputtering a metal Al target in an atmosphere of a gas mixture of nitrogen and argon. The glass laminates thus obtained were subjected to heat treatment for tempering at 650° C. for 3 minutes, and then cooled with air to give functional transparent articles. The visible light transmittance, heat transmittance, heat reflectance and haze of the functional transparent articles were measured with a spectrophotometer and a haze meter, respectively. The transparency and heat shielding ability were good with the visible light transmittance, heat transmittance and heat reflectance being 83.5%, 54.6% and 27.5%, respectively. The haze was also satisfactory and as low as 0.3%.

Further, the electrical properties of the laminated coatings thus obtained were measured by the four probe method. The laminated coatings just prepared had a sheet resistance of 8.0 Ω/□ before heat treatment. The glass laminates were maintained at temperatures of 550° C., 600° C. and 650° C. for 3 minutes, and the sheet resistances after the heat treatment were 6.0 Ω/□ for 550° C., 5.8 Ω/□ for 600° C. and 6.5 Ω/□ for 650° C. The decrease in the resistance accounts for decreased lattice defects in the annealed Ag-1 at % Pd layer.

Then, the five layer type glass laminates obtained in Examples 1 to 2 after the heat treatment of 650° C. and the three layer type glass laminates obtained in Example 5 after the heat treatment of 650° C. were bonded to another soda lime glass substrate (thickness: 2 mm) via a polyvinyl butyral adhesive layer (thickness: 0.76 mm) to give 5 kinds of laminated glasses. The visible light transmittances, heat transmittances and heat reflectances of the laminated glasses were measured and listed in Table 5 together with the visible light transmittances, heat transmittances and heat reflectances of the corresponding glass laminates after heat treatment.

TABLE 5

|  | Layer structure | Optical properties of a glass laminate after heat treatment | | | Optical properties of laminated glass | | |
|---|---|---|---|---|---|---|---|
|  |  | Visible light transmittance (%) | Heat transmittance (%) | Heat reflectance (%) | Visible light transmittance (%) | Heat transmittance (%) | Heat reflectance (%) |
| Example 1 | 5 layers | 75.3 | 49.2 | 30.8 | 71.5 | 43.1 | 31.9 |
| Example 2 | 5 layers | 74.0 | 48.1 | 31.3 | 70.3 | 42.0 | 31.4 |
| Example 5 | 3 layers | 83.5 | 54.6 | 27.5 | 83.4 | 65.2 | 17.9 |

Table 5 shows that the five layer type (two Ag-based layer type) laminated glasses had heat transmittances of about from 42 to 43%, while the three layer type (one Ag-based layer type) laminated glass had a heat transmittance of about 65%. Thus, a five layer type glass laminate can realize better heat shielding ability than a three layer type. Further, the five layer type laminated glasses had much higher heat reflectances (about from 31 to 32%) than the three layer type (about 18%) and were excellent in heat reflecting ability.

Conventional heat shielding by using colored glasses of green and bronze can attain only heat reflectances as low as from 6 to 7%, and because the heat shielding ability is attributable largely to the heat absorption by the glasses, part of the heat absorbed is emitted indoors again. Therefore, the glass laminate of the present invention is obviously superior in heat shielding ability.

The glass laminate of the present invention does not deteriorate in optical properties when heated for processing such as tempering or bending by virtue of its excellent heat resistance, and therefore is suitable as a material for functional transparent articles.

Accordingly, the glass substrate of the present invention, if once prepared in large size and in planar shape, can be subjected to processing (such as bending or tempering) after cut into desired size to give a functional transparent article, and therefore has a great merit in respect of storage, inventory and production.

In addition, according to the method of producing a functional transparent article of the present invention, a functional transparent article excellent in optical properties can be obtained by using the glass laminate of the present invention as a material.

Further, because the glass laminate does not deteriorate in optical properties when heated for processing such as tempering or bending, the method of producing a functional transparent article of the present invention affords stable production of a functional transparent article having desired properties.

What is claimed is:

1. A glass laminate comprising a glass substrate, an oxide layer as a first layer formed on the glass substrate, and at least one metal layer (B) and at least one layer (C) which are laminated in this order or alternately on the first layer, wherein the first layer comprises a zinc oxide film (A) containing Al in a ratio of Al/(Al+Zn) of from 15 to 50 at %, the layer (B) comprises Ag as the main component, the layer (C) is composed of at least one member selected from the group consisting of oxides, nitrides, carbides and double compounds thereof, and the total number of the first layer, the layer(s) (B) and the layer(s) (C) is 2n+1 (wherein n is a positive integer).

2. The glass laminate according to claim 1, wherein at least one layer (C) comprises a zinc oxide film (A) containing Al in a ratio of Al/(Al+Zn) of from 15 to 50 at %.

3. A glass laminate comprising a glass substrate, and an oxide layer as a first layer, a metal layer (B) and a layer (C) which are laminated on the substrate in this order from the substrate side, wherein the first layer comprises a zinc oxide film (A) containing Al in a ratio of Al/(Al+Zn) of from 15 to 50 at %, the layer (B) comprises Ag as the main component, the layer (C) is composed of at least one member selected from the group consisting of oxides, nitrides, carbides and double compounds thereof.

4. The glass laminate according to claim 3, wherein the layer (C) comprises a zinc oxide film (A) containing Al in a ratio of Al/(Al+Zn) of from 15 to 50 at %.

5. A glass laminate comprising a glass substrate, and an oxide layer as a first layer, a metal layer (B), a layer (C), a metal layer (B) and a layer (C) formed on the substrate in this order from the substrate side, wherein the first layer comprises a zinc oxide film (A) containing Al in a ratio of Al/(Al+Zn) of from 15 to 50 at % formed on the substrate side, the layers (B) are composed of a metal comprising Ag as the main component, the layers (C) are composed of at least one member selected from the group consisting of oxides, nitrides, carbides and double compounds thereof.

6. The glass laminate according to claim 5, wherein at least one layer (C) comprises a zinc oxide film (A) containing Al in a ratio of Al/(Al+Zn) of from 15 to 50 at %.

7. The glass laminate according to claim 1, wherein the first layer comprises the film (A) and an zinc oxide film (a) which contains Al in a ratio of Al/(Al+Zn) of from 1 to 10 at % and is formed in contact with a layer (B) composed of a metal comprising Ag as the main component, and the film (A) is formed between the glass substrate and the film (a).

8. A method of producing a functional transparent article comprising a step of treating the glass laminate according to claim 1 with heat at 570° C. or more.

9. A functional transparent article obtained by the method according to claim 8.

* * * * *

UNITED STATES PATENT AND TRADEMARK OFFICE
CERTIFICATE OF CORRECTION

PATENT NO. : 6,451,434 B1
DATED : September 17, 2002
INVENTOR(S) : Ebisawa et al.

It is certified that error appears in the above-identified patent and that said Letters Patent is hereby corrected as shown below:

<u>Title page,</u>
Item [30], the Foreign Application Priority Data should read:
-- [30]     Foreign Application Priority Data
Dec. 18, 1998   (EP) .................................. 98204316 --

Signed and Sealed this

Twenty-first Day of January, 2003

JAMES E. ROGAN
*Director of the United States Patent and Trademark Office*